United States Patent [19]

Whitt

[11] 4,005,683

[45] Feb. 1, 1977

[54] ENERGY CONVERSION DEVICE

[76] Inventor: Raymond Douglas Whitt, 4664 19th St., San Francisco, Calif. 94114

[22] Filed: Oct. 7, 1974

[21] Appl. No.: 512,695

[52] U.S. Cl. .............................. 123/25 B; 123/3; 123/25 R; 123/119 E; 123/122 E

[51] Int. Cl.² ........................................ F02D 19/00

[58] Field of Search ............ 123/25 B, 25 D, 25 R, 123/119 E, 25 A, 25 L, 3, 122 E, 122 F

[56] References Cited

UNITED STATES PATENTS

| | | | |
|---|---|---|---|
| 1,205,693 | 11/1916 | Woolf et al. | 123/25 B X |
| 1,512,242 | 10/1924 | Schmitt | 123/25 B |
| 1,749,030 | 3/1930 | Ingelton | 123/25 B |
| 1,888,682 | 11/1932 | Mazarek | 123/25 B |
| 2,036,834 | 4/1936 | Schmitt | 123/25 B X |
| 2,580,013 | 12/1951 | Gazda | 123/25 R |
| 2,843,216 | 7/1958 | Powell | 123/25 R |
| 3,177,633 | 4/1965 | McDonald | 123/119 E X |
| 3,266,783 | 8/1966 | Knight | 123/119 E X |
| 3,349,354 | 10/1967 | Miyata | 123/119 E |
| 3,830,621 | 8/1974 | Miller | 123/119 E |

Primary Examiner—Charles J. Myhre
Assistant Examiner—Ira S. Lazarus
Attorney, Agent, or Firm—Charles E. Quarton

[57] ABSTRACT

An energy conversion device for supplying a combustible mixture to an engine having an injector body and discharge means for directing fuel and water into the injector body. Means is provided for supplying heated fuel and heated water to the discharge means. An electromagnetic coil is positioned in the injector body downstream of the discharge means to provide an electromagnetic field for acting on the fuel and water directed into the injector body.

18 Claims, 5 Drawing Figures

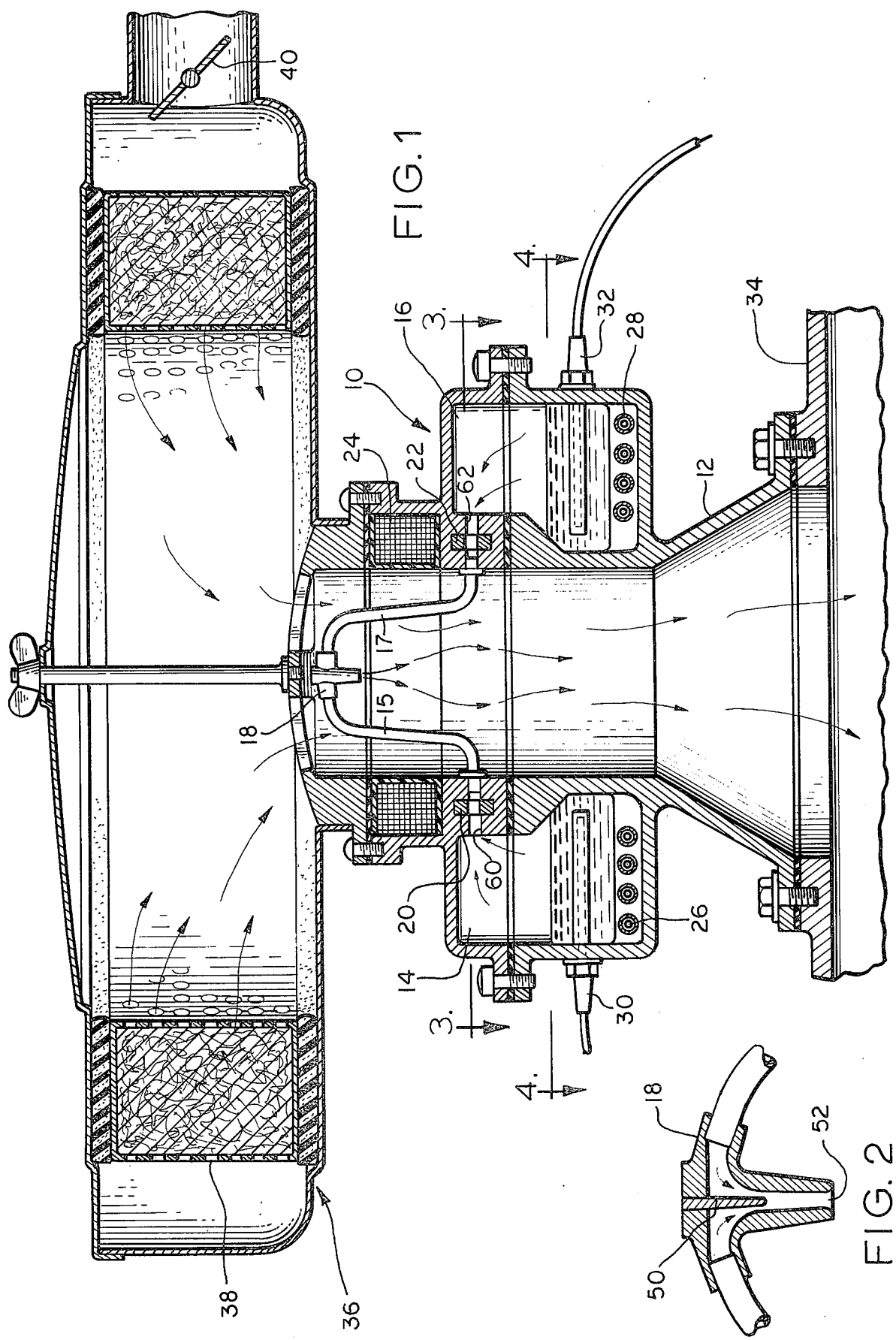

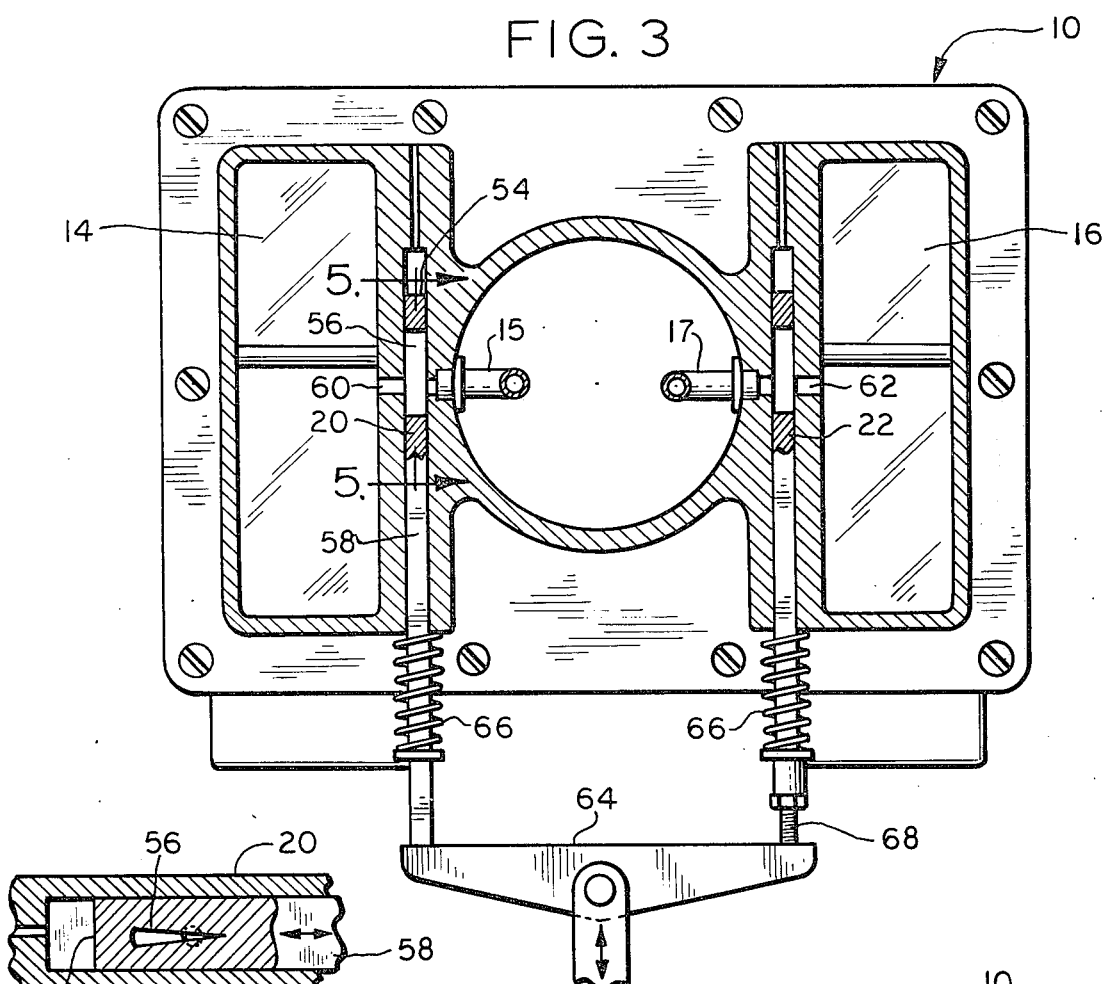
FIG. 3
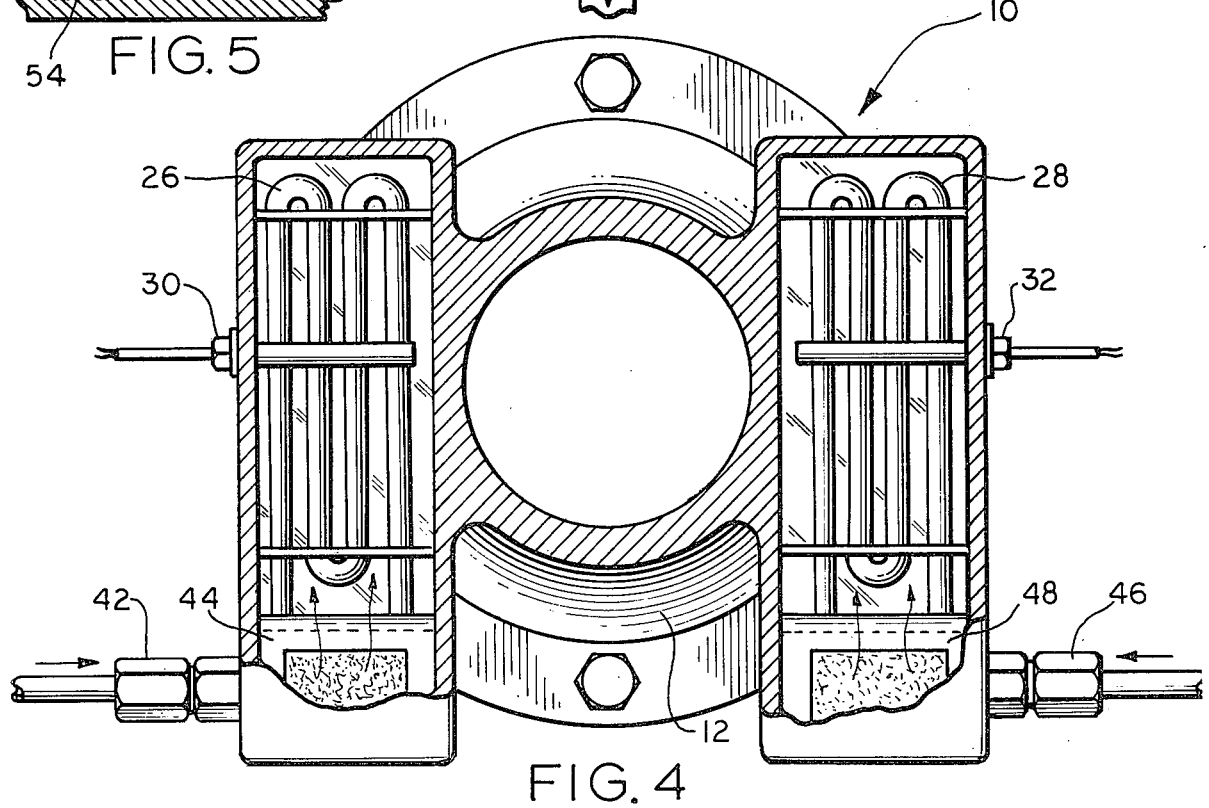
FIG. 5
FIG. 4

4,005,683

ENERGY CONVERSION DEVICE

The invention relates to an energy conversion device for supplying a combustible mixture to an engine.

More particularly, the invention relates to an energy conversion device that supplies heated water and heated fuel to a discharge means. The discharge means directs the fuel and water into an air stream to form a combustible mixture for the engine asosociated with the energy conversion device.

The efficient operation of an engine is affected by the quality of the combustible mixture being supplied to the engine. It has been discovered that the performance of an engine can be increased by using the energy conversion device of the present invention to supply an engine with a combustible mixture produced in the device.

The energy conversion device of the present invention supplies heated fuel, such as gasoline, and heated water to a discharge means. The discharge means directs the fuel and water into an injector body of the energy conversion device. The injector body receives a stream of air with which the fuel and water are mixed. An electromagnetic field is generated in the energy conversion device downstream of the discharge means and acts on the fuel and water in the air stream.

It has been discovered empirically that the combustible mixture produced in the energy conversion device increases the performance of the engine being supplied with the combustible mixture, such as an internal combustion engine in an automobile. The precise scientific explanation for the operation of the energy conversion device is not understood. However, the empirical factors for the operation of the energy conversion device of the present invention have been discovered and are disclosed herein.

In summary, the invention contemplates an energy conversion device for supplying an engine with a combustible mixture, having an injector body for carrying an air stream and discharge means for directing fuel and air into the air stream of the injector body. Means is provided for supplying heated fuel to the discharge means and means is provided for supplying heated water to the discharge means. Means is also provided for generating an electromagnetic field downstream of the discharge means for acting on the fuel and water directed into the air stream of the injector body.

Other features of this invention and its operation will become apparent from a review of the detailed description and the drawings in which:

FIG. 1 is a sectional view of an energy conversion device embodying the present invention;

FIG. 2 is a detail view of a discharge nozzle used in the energy conversion device of the present invention;

FIG. 3 is a sectional view taken along 3—3 in FIG. 1 of the energy conversion device;

FIG. 4 is a sectional view taken along 4—4 in FIG. 1 of the energy conversion device; and FIG. 5 is a sectional view taken along 5—5 in FIG. 3 showing a metering valve used in the energy conversion device.

Referring to FIG. 1, an energy conversion device embodying the present invention is indicated generally by the numeral 10. The energy device 10 is utilized for supplying a combustible mixture to an engine, such as an internal combustion engine in an automobile. The energy conversion device 10 includes an injector body 12 for carrying an air stream that is drawn through the injector body by the engine. A fuel chamber 14 is provided for receiving fuel, such as gasoline, and a water chamber 16 is provided for receiving a supply of water.

A discharge nozzle 18 receives fuel from the fuel chamber 14 through a conduit 15 and receives water from the water chamber 16 through a conduit 17. The flow of fuel and water to the discharge nozzle 18 is controlled by metering valve units 20 and 22, respectively. The metering valve units 20 and 22 operate to provide a predetermined ratio of fuel and water, and to meter the quantity of fuel and water that is provided to the discharge nozzle 18. The discharge nozzle 18 directs the fuel and water into the air stream carried by the injector body 12.

An electromagnetic coil 24 is positioned along the injector body 12 downstream from the discharge nozzle 18. The electromagnetic coil 24 generates an electromagnetic field for acting on the fuel and water directed into the air stream of the injector body.

The fuel chamber 14 and the water chamber 16 are equipped with heating elements 26 and 28, respectively. The heating elements 26 and 28, respectively. The heating elements 26 and 28 are utilized for heating the fuel and water in the fuel chamber 14 and the water chamber 16 to a predetermined temperature as detailed hereinafter.

Temperature sensors 30 and 32 are provided in the fuel chamber 14 and the water chamber 16, respectively. The temperature sensors 30 and 32 are utilized in combination with conventional thermostatic controls, not shown, to control the heat energy supplied by the heating elements 26 and 28, and thus maintain the fuel and water at the predetermined temperatures.

The injector body 12 of the energy conversion device 10 is coupled to an intake manifold 34 of the engine being supplied with a combustible mixture. In a typical application of the invention, the energy conversion device 10 can be used with an internal combustion engine, such as used in an automobile. In this instance, the injector body 12 can be configured to mate with the configuration of the intake manifold 34 of the particular engine. Alternatively, an adapter can be utilized to mate a standard configuration of the injector body 12 with the various types of intake manifolds.

Preferably, the energy conversion device 10 is fitted with a conventional air cleaner assembly 36. The air cleaner assembly 36 includes an air filter 38 for cleaning the air that is supplied to the injector body 12. A conventional choke unit 40 may be utilized as part of the air cleaner assembly 36 to control the air supply to the combustible mixture during cold start operations of the engine.

Referring to FIG. 4, a fuel supply line 42 is connected to a conventional float and needle valve assembly 44 associated with the fuel chamber 14. Also, a water supply line 46 is coupled to a conventional float and needle valve assembly 48 associated with the water chamber 16. The float and needle valve assemblies 44 and 46 operate to maintain a supply of fuel and water in the fuel chamber 14 and the water chamber 16 at a predetermined pressure. Preferably, the fuel and water are maintained at 15 psi in the chambers 14 and 16. The float and needle valve assemblies 44 and 48 are of a conventional construction known in the art and do not require detailed explanation.

Referring to FIG. 2, the discharge nozzle 18 includes a stop 50 for diverting the flow of fuel and water being supplied by the conduits 15 and 17. The stop 50 diverts the fuel and water to an outlet port 52 in the discharge nozzle 18. The fuel and water pass from the outlet port 52 into the air stream of the injector body 12.

Referring to FIGS. 3 and 5, the metering valve unit 20 includes a valve body 54 having a wedge-shaped aperture 56. The valve body 54 is disposed in a slide channel 58 of the energy conversion device. As the valve body 54 slides along the channel 58, the wedge-shaped aperture 56 moves over the aperture 60 in the fuel chamber 14. The positioning of the wedge-shaped aperture 56 over the aperture 60 controls the outlet of the aperture and thus varies the flow of fuel out of the fuel chamber 14. Thus, the positioning of the valve body 56 in the slide channel 58 controls the quantity of fuel leaving the fuel chamber 14 for supply to the discharge nozzle 18.

The metering valve unit 22 associated with the water chamber 16 is substantially similar to the metering valve unit 20. The metering valve unit 22 includes a slide channel and a valve body associated with an aperture 62 in the water chamber 16. It will be appreciated that the wedge-shaped aperture in the valve body for the water metering valve unit 22 need not be identical to the wedge-shaped aperture 56 in the fuel metering valve unit. The apertures in the metering valve units 20 and 22 can be varied to vary the ratio of fuel and water being supplied to the discharge nozzle 18.

The metering valve units 20 and 22 are connected to a linkage assembly 64 to operate the valve bodies within the slide channels. The linkage assembly 64 includes return springs 66 to return the metering valve units 20 and 22 to an idle position. An adjustable link 68 is provided in the linkage assembly 64 in order that the initial setting of the metering valve unit 22 can be varied with respect to the fuel metering valve unit 20.

The desired ratio of water to fuel is in the range of from 0 to 2 gallons of water for 8 gallons of gasoline fuel. At idle conditions, the demand for power is low and as a result, the amount of water in th combustible mixture can be 0, if desired. This adjustment can be accomplished with the adjustable link 68.

When gasoline is being used, the temperature of the fuel in the fuel chamber 14 is heated to a minimum of about 210° F for proper operation. The preferred operating temperature for the fuel is 260° F.

The water in the water chamber 16 is heated to a temperature sufficient to produce steam when the water is directed by the discharge nozzle 18 into the injector body 12. The desired temperature for the water is 240° F in the energy conversion device.

In an operating model of the energy conversion device, the electromagnetic coil 24 was connected to a 110 volt DC power source. The coil was one inch high, with an inside diameter of 3 5/16 inches and an outside diameter of 4 1/16 inches. The coil was formed from 28 gauge wire having a varnish insulation.

The operating model of the energy conversion device utilized non-magnetic materials with the exception of the conduits 15 and 17 and the discharge nozzle 18 which were formed from stainless steel.

It is to be understood that various modifications can be made to the disclosed energy conversion device without departing from the scope of the invention, and it is intended to cover in the appended claims all such modifications as fall within the true spirit and scope of the invention.

I claim:
1. An energy conversion device for supplying a combustible mixture to an engine comprising:
an injector body for carrying an air stream;
discharge means for directing fuel and water into the air stream of the injector body;
means for providing a supply of heated fuel to said discharge means;
means for providing a supply of heated water to said discharge means;
means for generating a randomly oriented electromagnetic field downstream of the discharge means for acting on the fuel and water directed into the air stream of the injector body.
2. The device of claim 1 wherein the fuel is heated to at least a temperature of about 210° F.
3. The device of claim 2 wherein the water is heated to a temperature sufficient to generate steam in the injector body.
4. The device of claim 1 including valve means for metering the heated fuel being supplied to said discharge means.
5. The device of claim 4 including valve means for metering the heated water being supplied to said discharge means.
6. The device of claim 5 wherin the fuel is heated to at least a temperature of about 210° F.
7. The device of claim 6 wherein the water is heated to a temperature sufficient to generate steam in the injector body.
8. The device of claim 5 wherein the fuel metering means and the water metering means meter fuel and water to the discharge means in the ratio of from 0 to 2 gallons of water for 8 gallons of fuel.
9. The device of claim 8 wherein the fuel is heated to at least a temperature of about 210° F.
10. The device of claim 9 wherein the water is heated to a temperature sufficient to generate steam in the injector body.
11. The device of claim 1 wherein the means for generating an electromagnetic field includes an electromagnetic coil positioned along the injector body downstream of the discharge means.
12. The device of claim 1 wherein the fuel is heated to a temperature of about 260° F.
13. The device of claim 12 wherein the water is heated to a temperature of about 240° F.
14. A method of supplying a combustible mixture to an engine comprising:
heating a supply of fuel to a predetermined temperature;
heating a supply of water to a predetermined temperature;
directing the heated fuel and the heated water into an air stream; and
subjecting the heated fuel, heated water, and air stream to a randomly oriented electromagnetic field.
15. The method of claim 14 wherein the fuel is at least heated to a temperature of about 210° F.
16. The method of claim 15 wherein the water is heated to a temperature sufficient to generate steam in the air stream.
17. The method of claim 14 wherein the fuel is heated to a temperature of about 260° F.
18. The method of claim 17 wherein the water is heated to a temperature of about 240° F.

* * * * *

UNITED STATES PATENT AND TRADEMARK OFFICE
CERTIFICATE OF CORRECTION

PATENT NO. : 4,005,683
DATED : February 1, 1977
INVENTOR(S) : Raymond Douglas Whitt It is certified that error appears in the above-identified patent and that said Letters Patent are hereby corrected as shown below:

Column 1, line 10, delete "asosociated" and insert --associated--.

Column 1, line 65, after "energy" insert --conversion--.

Column 2, line 23, delete "The heating elements 26 and 28, respectively."

Column 3, line 40, delete "th" and insert therefor--the--.

Claim 6, line 1, delete "wherin" and insert --wherein--.

Signed and Sealed this ninth Day of August 1977

[SEAL]

Attest:

RUTH C. MASON
Attesting Officer

C. MARSHALL DANN
Commissioner of Patents and Trademarks